3,038,892
OLEFIN POLYMERIZATION CATALYSTS CONTAINING ALUMINUM DIHALIDES, METAL ALCOHOLATES AND ALKALI METAL FLOURIDES
Harry W. Coover, Jr., Kingsport, Tenn., assignor to Eastman Kodak Company, Rochester, N.Y., a corporation of New Jersey
No Drawing. Filed Apr. 3, 1958, Ser. No. 726,065
12 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins using a particular catalyst combination which has unexpectedly improved catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

This application is a continuation-in-part of my copending application, Serial No. 549,860, filed November 29, 1955, now Pat. No. 2,833,755.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this same aluminum triethyl is used in conjunction with a titanium tetraalkoxide, such as titanium tetrabutoxide, the mixture does not produce solid polyethylene for some reason which is not apparent. A mixture of an alkyl aluminum dihalide and a titanium tetraalkoxide can be used to polymerize ethylene to form high density crystalline polymers, but when this catalyst is used to polymerize propylene and higher monoolefins, high yields of polymeric oils and rubbers and relatively low yields of high molecular weight crystalline polymers are produced. When a solid polyolefin of high density and high crystallinity is desired, a catalyst that produces large quantities of oils and rubbers is undesirable and in some instances commercially inadequate.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpectedly improved catalytic activity for the polymerization of propylene and higher α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing an aluminum dihalide having the formula $RAlX_2$ wherein R is selected from the group consisting of alkyl radicals containing from 1 to 12 carbon atoms, phenyl and benzyl and X is a halide selected from the group consisting of chlorine, bromine and iodine, an alcoholate of a transition metal selected from the group consisting of titanium, vanadium, zirconium, chromium and molybdenum, wherein the alcoholate is selected from the group consisting of alkoxides containing from 1 to 12 carbon atoms and phenoxides and an alkali metal fluoride. Among the alcoholates that can be used are the ethoxides, propoxides, butoxides, the hexoxides, the octoxides, the dodecoxides as well as the metal alkoxy halides, such as dibutoxy dichloride and other alkoxy halides of the above transition metals. The improved catalytic activity of this mixture was wholly unexpected, particularly since mixtures containing only the aluminum dihalides and the metal alcoholates described above produce large amounts of comparatively low molecular weight products in the polymerization of propylene and higher olefins, and the alkali metal fluoride of the catalyst is not a known polymerization catalyst. The inventive process can be carried out in liquid phase in an inert organic liquid and preferably an inert liquid hydrocarbon vehicle, but excellent results can be obtained without using a solvent. The process proceeds with excellent results over a temperature range of from 0° C. to 250° C. but temperatures outside this range can be used if desired. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are particularly useful for polymerizing propylene to form a crystalline, high-density polymer. The polypropylene produced has a softening point above 155° C. and a density of 0.91 and higher. Usually the density of the polypropylene is of the order of 0.91 and 0.92.

The polypropylene, polystyrene, polybutenes and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

As has been indicated above the improved results obtained in accordance with this invention depend upon the particular catalyst combination. Thus, one of the components of the catalyst is an aluminum dihalide having the formula $RAlX_2$ wherein R is a hydrocarbon radical as defined above. Preferably R is a lower alkyl radical containing 1 to 4 carbon atoms or phenyl, and the most preferred dihalide is ethyl aluminum dichloride. Another component of the catalyst composition is an alcoholate of a transition metal selected from the group consisting of titanium, vanadium, zirconium, chromium and molybdenum. Preferably the alcoholate is an alkoxide radical containing 1 to 12, preferably 1 to 4, carbon atoms. In these alcoholates the transition metal is preferably at its maximum valence, but alcoholates of transition metals having reduced valences can be used. For most desirable results it is preferred to use an alkoxide of titanium, for example, titanium ethoxide and titanium butoxide, and the titanium tetraalkoxides are usually used. It will be understood that the alkoxides of the other transition metals can be used if desired. A further component of the catalyst composition is an alkali metal fluoride, the alkali metal being selected from the group consisting of sodium, potassium and lithium. The catalyst compositions of this invention, when reacted with water, do not produce hydrogen.

The limiting factor in the temperature of the process appears to be the decomposition temperature of the catalyst. Ordinarily temperatures from 50° C. to 150° C. are employed, although temperatures as low as 0° C. can be employed if desired. Usually, it is not desirable or economical to effect the polymerization at temperatures below 0° C., and the process can be readily controlled at room temperature or higher when it is an advantage from the standpoint of commercial processing. The pressure employed is usually only sufficient to maintain reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations of 5–10% by weight in a solution process are ordinarily less desirable because the polymer dissolved in the reaction medium results in a very viscous solution.

The molar ratio of aluminum dihalide to transition metal alcholate can be varied within the range of 1:0.25 to 1:2, and the molar ratio of aluminum dihalide to alkali metal fluoride can be varied within the range of 1:1 to 1:0.2, but it will be understood that higher and lower molar ratios are within the scope of this invention. A particularly effective catalyst contains one mole of transition metal alcoholate and 0.25 mole of alkali metal fluoride per mole of aluminum dihalide. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The importance of the various components of this reaction mixture is evident from the fact that in polymerizing propylene a mixture of one of the aluminum dihalides and transition metal alcoholates produces large amounts of low molecular weight rubbery polymer. However, when the alkali metal fluoride is added to the mixture the resulting catalyst composition is highly effective for polymerizing propylene to form a highly crystalline high-density polymer.

Thus, by means of this invention polyolefins such as polypropylene are readily produced using a catalyst combination that has been found to have unexpected activity for producing highly crystalline polymer in excellent yields. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combination within the scope of this invention contains relatively small amounts, if any, of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalyst defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example by washing with water or lower aliphatic alcohols such as methanol.

The catalyst compositions have been described above as being effective primarily for the polymerization of $\alpha$-monoolefins. These catalyst compositions can, however, be used for polymerizing other $\alpha$-olefins, and it is not necessary to limit the process of the invention to monoolefins. Other $\alpha$-olefins that can be used are butadiene, isoprene, 1,3-pentadiene and the like.

The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with polymerizable $\alpha$-monoolefin.

The following examples are illustrative of this invention.

*Example 1*

A clean, dry stainless steel autoclave was placed in a nitrogen filled dry box and loaded with 1 g. of ethylaluminum dichloride, 2.7 g. titanium tetrabutoxide, and 0.33 g. of sodium fluoride. The autoclave was attached to a rocket and 100 ml. (51 g.) of propylene was added. The temperature was raised to 70° C. The autoclave was rocked under these conditions for eight hours. The yield of highly crystalline polypropylene was 34 g. of density 0.917 and inherent viscosity 2.55.

*Example 2*

The procedure of Example 1 was repeated using a polymerization temperature of 35° C. for 24 hours. The product was 33 g. of polymer which upon extraction with heptane gave 23 g. of highly crystalline polypropylene of density 0.920 and inherent viscosity 2.93.

*Example 3*

The procedure of Example 1 was followed, except that 100 ml. of 3-methyl-1-butene was used, and the polymerization temperature was 150° C. The yield was 30 g. of highly crystalline poly 3-methyl-1-butene.

*Example 4*

The procedure of Example 1 was followed, at 125° C. polymerization temperature using 100 ml. of 4-methyl-1-pentene. The product was 34 g. of highly crystalline poly 4-methyl-1-pentene.

*Example 5*

An autoclave was charged with 1 g. ethyl aluminum dichloride, 1.7 g. titanium tetraphenoxide, 0.20 g. sodium fluoride, and 100 m. liquid propylene. The temperature was raised to 90° C. and the mixture was rocked for 8 hours. The product was 35 g. of polymer from which 26 g. of highly crystalline polypropylene was isolated by extraction with dibutyl ether and heptane.

*Example 6*

Example 5 was repeated except that the titanium tetraphenoxide was replaced by 1.2 g. diphenoxy titanium dichloride and 1.0 g. of sodium fluoride was used. The yield was 28 g. of polymer from which 13.6 g. of crystalline polypropylene was isolated by extraction with dibutyl ether and heptane.

*Example 7*

Example 5 was repeated except that the titanium tetraphenoxide was replaced by 1.2 g. of diphenoxy titanium dichloride and the sodium fluoride was increased to 0.7 g. The yield was 31 g. of polymer which upon extraction gave 24 g. of highly crystalline polypropylene.

*Example 8*

Example 5 was repeated except that the ethly aluminum dichloride was replaced by 1.4 g. of phenyl aluminum dichloride. The yield was 37 g. of polymer from which 28 g. of highly crystalline polymer was isolated by extraction.

*Example 9*

The autoclave was charged with 1.4 g. phenyl aluminum dichloride, 0.9 g. titanium tetrabutoxide, 0.7 g. sodium fluoride and 100 ml. of liquid propylene. The mixture was rocked at 100° C. for 8 hours. The product was 38 g. of polypropylene from which a highly crystalline fraction weighing 29 g. was isolated by extraction.

*Example 10*

A 3 l. flask equipped with an air-driven stirrer, a reflux condenser, and a heating mantle was charged with 1 g. ethyl aluminum dichloride, 2.7 g. titanium tetrabutoxide, 0.33 g. of sodium fluoride and 1 l. of dry heptane. With stirring at 70° C. propylene was passed through the mixture at atmospheric pressure. At the end of 12 hours the contents of the flask were cooled to 50° C. and treated with ethanol. After filtration and washing with ethanol and water, 20 g. of highly crystalline polypropylene was isolated.

*Example 11*

Example 10 was repeated except that propylene was used at 30 p.s.i.g. The yield was 50 g. of polymer which upon extraction gave a highly crystalline residue weighing 35 g.

Example 12

The process of Example 10 was employed to improve the yields of crystalline polymers using as monomers 1-butene, 4-methyl-1-pentene, styrene, alkyl benzene, vinyl cyclohexane and fluorostyrene.

We claim:

1. In the polymerization of α-olefinic hydrocarbon containing 3-10 carbon atoms to form solid crystalline polymer, the improvement which comprises catalyzing the polymerization with a catalytic mixture consisting essentially of an aluminum dihalide having the formula $RAlX_2$ wherein R is selected from the group consisting of alkyl radicals containing 1 to 12 carbon atoms, phenyl and benzyl and X is a halogen selected from the group consisting of chlorine, bromine and iodine, an alcoholate of titanium, the alcoholate being selected from the group consisting of alkoxides containing 1 to 12 carbon atoms and phenoxides and a fluoride of an alkali metal selected from the group consisting of sodium, potassium and lithium, the molar ratio of aluminum dihalide to alcoholate being within the range of 1:0.25 to 1:2, and the molar ratio of aluminum dihalide to alkali metal fluoride being within the range of 1:1 to 1:0.2.

2. In the polymerization of propylene to form solid crystalline polymer, the improvement which comprises effecting the polymerization in the presence of a catalytic mixture consisting essentially of a lower alkyl aluminum dihalide, a titanium alkoxide, the alkoxide radicals containing 1 to 4 carbon atoms, and a fluoride of an alkali metal selected from the group consisting of sodium, potassium and lithium, the molar ratio of alkyl aluminum dihalide to titanium alkoxide being within the range of 1:0.25 to 1:2 and the molar ratio of alkyl aluminum dihalide to alkali metal fluoride being within the range of 1:1 to 1:0.2.

3. In the polymerization of propylene to form solid crystalline polymer the improvement which comprises effecting the polymerization in liquid dispersion in an inert organic liquid and in the presence of a catalytic mixture consisting essentially of ethyl aluminum dichloride, titanium tetrabutoxide and sodium fluoride the molar ratio ratio of ethyl aluminum dichloride to titanium tetrabutoxide being within the range of 1:0.25 to 1:2 and the molar ratio of ethyl aluminum dichloride to sodium fluoride being within the range of 1:1 to 1:0.2.

4. In the polymerization of propylene to form solid crystalline polymer the improvement which comprises effecting the polymerization in liquid dispersion in an inert liquid hydrocarbon vehicle and in the presence of a catalytic mixture consisting essentially of phenyl aluminum dichloride, titanium tetrabutoxide and sodium fluoride the molar ratio of phenyl aluminum dichloride to titanium tetrabutoxide being within the range of 1:0.25 to 1:2 and the molar ratio of phenyl aluminum dichloride to sodium fluoride being within the range of 1:1 to 1:0.2.

5. In the polymerization of propylene to form solid crystalline polymer, the improvement which comprises effecting the polymerization in liquid dispersion in an inert liquid hydrocarbon vehicle and in the presence of a catalytic mixture consisting essentially of ethyl aluminum dichloride, titanium tetraphenoxide, and sodium fluoride the molar ratio of ethyl aluminum dichloride to titanium tetraphenoxide being within the range of 1:0.25 to 1:2 and the molar ratio of ethyl aluminum dichloride to sodium fluoride being within the range of 1:1 to 1:0.2.

6. In the polymerization of propylene to form solid crystalline polymer, the improvement which comprises effecting the polymerization in liquid dispersion in an inert liquid hydrocarbon vehicle and in the presence of a catalytic mixture consisting essentially of ethyl aluminum dichloride, diphenoxy titanium dichloride and sodium fluoride the molar ratio of ethyl aluminum dichloride to diphenoxy titanium dichloride being within the range of 1:0.25 to 1:2 and the molar ratio of ethyl aluminum dichloride to sodium fluoride being within the range of 1:1 to 1:0.2.

7. As a composition of matter, a polymerization catalyst consisting essentially of an aluminum dihalide having the formula $RAlX_2$ wherein R is selected from the group consisting of alkyl radicals containing 1 to 12 carbon atoms, phenyl and benzyl and X is a halogen selected from the group consisting of chlorine, bromine and iodine, an alcoholate of titanium, the alcoholate being selected from the group consisting of alkoxide radicals containing from 1 to 12 carbon atoms and phenoxides, and a fluoride of an alkali metal selected from the group consisting of sodium, potassium and lithium, the molar ratio of aluminum dihalide to alcoholate being within the range of 1:0.25 to 1:2 and the molar ratio of aluminum dihalide to alkali metal fluoride being within the range of 1:1 to 1:0.2.

8. As a composition of matter, a polymerization catalyst consisting essentially of a lower alkyl aluminum dihalide, a titanium alkoxide, the alkoxide radicals containing 1 to 4 carbon atoms, and a fluoride the molar ratio of alkyl aluminum dihalide to titanium alkoxide being within the range of 1:0.25 to 1:2 and the molar ratio of alkyl aluminum dihalide to alkali metal fluoride being within the range of 1:1 to 1:0.2.

9. As a composition of matter, a polymerization catalyst consisting essentially of ethyl aluminum dichloride, titanium tetrabutoxide and sodium fluoride the molar ratio of ethyl aluminum dichloride to titanium tetrabutoxide being within the range of 1:0.25 to 1:2 and the molar ratio of ethyl aluminum dichloride to sodium fluoride being within the range of 1:1 to 1:0.2.

10. As a composition of matter, a polymerization catalyst consisting essentially of phenyl aluminum dichloride, titanium tetrabutoxide and sodium fluoride the molar ratio of phenyl aluminum dichloride to titanium tetrabutoxide being within the range of 1:0.25 to 1:2 and the molar ratio of phenyl aluminum dichloride to sodium fluoride being within the range of 1:1 to 1:0.2.

11. As a composition of matter, a polymerization catalyst consisting essentially of ethyl aluminum dichloride, titanium tetraphenoxide and sodium fluoride the molar ratio of ethyl aluminum dichloride to titanium tetraphenoxide being within the range of 1:0.25 to 1:2 and the molar ratio of ethyl aluminum dichloride to sodium fluoride being within the range of 1:1 to 1:0.2.

12. As a composition of matter, a polymerization catalyst consisting essentially of ethyl aluminum dichloride, diphenoxy titanium dichloride and sodium fluoride the molar ratio of ethyl aluminum dichloride to diphenoxy titanium dichloride being within the range of 1:0.25 to 1:2 and the molar ratio of ethyl aluminum dichloride to sodium fluoride being within the range of 1:1 to 1:0.2.

References Cited in the file of this patent

UNITED STATES PATENTS

| | | |
|---|---|---|
| 2,827,446 | Breslow | Mar. 18, 1958 |
| 2,827,447 | Nowlin et al. | Mar. 18, 1958 |
| 2,833,755 | Coover | May 6, 1958 |
| 2,843,577 | Friedlander et al. | July 15, 1958 |
| 2,862,917 | Anderson et al. | Dec. 2, 1958 |
| 2,886,561 | Reynolds et al. | May 12, 1959 |
| 2,899,413 | Hagemeyer et al. | Aug. 11, 1959 |

FOREIGN PATENTS

| | | |
|---|---|---|
| 1,134,740 | France | Dec. 3, 1956 |